Patented July 22, 1930

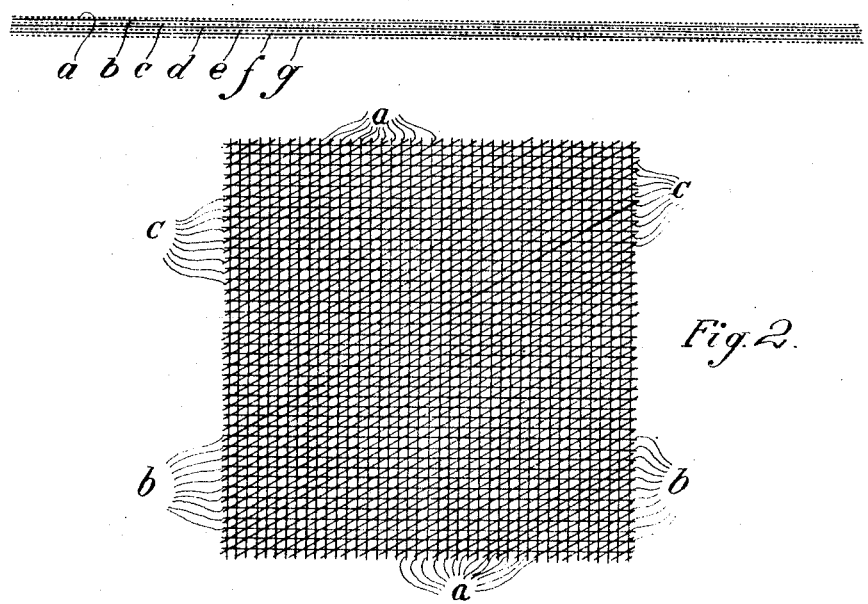
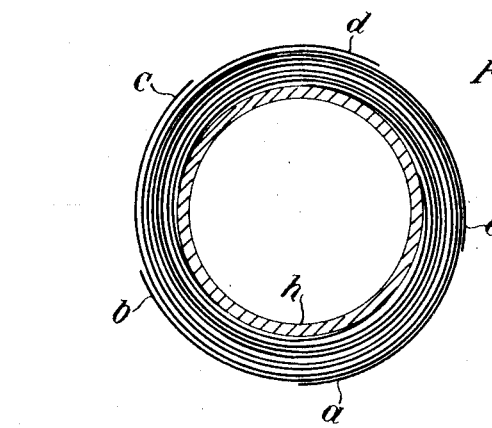
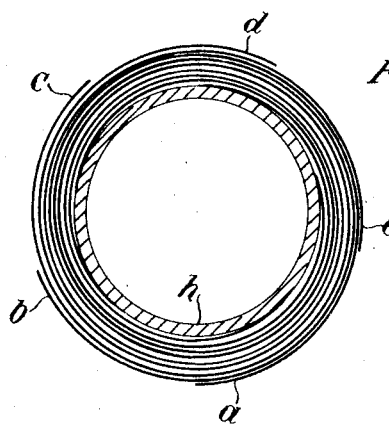
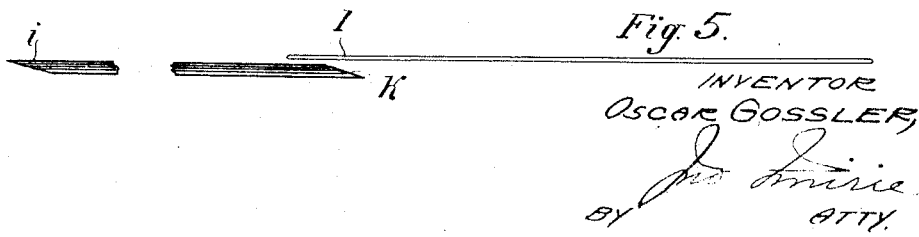

1,771,216

UNITED STATES PATENT OFFICE

OSCAR GOSSLER, OF HAMBURG, GERMANY

INSULATING BODY OF SPUN GLASS

Application filed December 9, 1926, Serial No. 153,680, and in Germany October 26, 1925.

This invention is directed to the production of insulating bodies constructed of spun glass, wherein the glass threads are arranged parallel to one another and transversely to the flow of heat.

The primary object of the present invention is the provision of an insulating body or the like in which the spun glass is arranged in superimposed layers, with the threads in any one layer parallel to one another and the threads of different layers crossing one another at an angle.

The invention is illustrated in the accompanying drawings, in which:—

Figure 1 is a sectional view showing a plurality of superimposed layers of spun glass in making up the desired article.

Figure 2 is a plan indicating the parallel relation of the respective threads of any one layer and the angular relation of the threads of one layer with respect to the threads of an adjacent layer.

Figure 3 is a transverse sectional view showing the insulating body encircling a pipe to be insulated.

Figure 4 is an edge view of the composite insulating body indicating particularly the relative shaping of the respective layers of spun glass in the winding of the insulating body around the pipe.

Figure 5 is a similar view showing the addition of a layer of any other material as an extension of the insulating body.

The insulating body of this invention is made up of an appropriate and desired number of layers of spun glass, the separate layers being indicated, for example, at $a$, $b$, $c$, $d$, $e$, $f$ and $g$ in Figure 1 of the drawings. The arrangement of the respective layers of the spun glass is indicated more particularly in Figure 2. From this figure it will be noted that the respective layers are made up of glass threads which in the particular layer are arranged substantially parallel one to the other. The next superimposed layer, indicated for example at $b$ in Figure 2, which superimposed layer is also made up of spun glass with the threads arranged in relatively parallel relation, is then superimposed on layer $a$ arranged at an angle thereto, that is the threads of layer $b$ will be at an angle to the threads of layer $a$. In Figure 2, the layer $b$ is shown with its threads disposed at right angles to the threads of layer $a$. The next superimposed layer, also composed of spun glass with the threads arranged in relatively parallel relation, will be arranged with its threads at an angle to the threads of both layers $a$ and $b$, that is, as indicated in Figure 2, layer $c$ is shown with its threads crossing the threads of both layers $a$ and $b$ and at an angle to each. This arrangement of the respective layers may be carried out throughout the full desired thickness of the insulating body.

A characteristic feature of the invention exists in the fact that the respective layers are wholly free of connection one with the other and that each layer is capable of a longitudinal shifting independently of any other layer. When the desired number of layers have been arranged in the described relation, the respective upper and lower surfaces of the body, that is of the plurality of layers, is impregnated on one or both surfaces. The impregnating means may be, for example, water glass, rubber solution or other means in which the requirement of presenting an adhesive influence while avoiding rigidity after adhesion is the pertinent feature. That is to say, the means employed for impregnating the surfaces of the body must have the desired adhesive effect but must prevent the glass threads of the respective outer and inner layers from becoming brittle. In other words, the impregnating means must maintain the desired elasticity required to permit complete lack of brittleness in the glass threads forming the impregnated layers.

As a result of the impregnation, the lower surface of the body presents a more or less plane or flat surface, thus permitting the handling of the body as an entirety in a manner similar to the handling of a band or section of textile fabric or the like.

If the insulating body be wound about a pipe, as indicated at $h$ in Figure 3, the respective layers making up the body are longitudinally shifted so that there is presented a thickness made up of glass threads which is substantially uniform about the pipe. If desired, the insulating body, when wound about the pipe, may be protected by an outer layer as, for example, of fabric, wire gauze or other material which forms no part of the present invention and is not required to be illustrated. Incident to the shifting of the several layers of the body during the winding of the same about the pipe, a more or less secure hold is given to the insulating material notwithstanding the relative plane between the layers, thus preventing the body as a whole from turning around the pipe.

The manner in which the layers relatively shift during the winding operation is indicated clearly in Figure 4 of the drawings. If desired, a fabric section or other protective element, indicated at $l$ in Figure 5, may be secured to the side edge of the inner layer of the body, the securing means being, if preferred, the means used for impregnating the lower layer of the body.

In thus providing an insulating body in which the layers are relatively movable, with each layer made up of parallel threads of spun glass, with the threads of one layer at an angle to the threads of the other, the known inconveniences and objections to bodies of this type wherein the layers of glass threads are connected by bands or strips or united by sewing are entirely avoided. Where the threads making up the body are connected against relative shifting, the uniform application of the layer in more or less concentric relation on the body being insulated is, of course, impossible.

I claim:

1. An insulating body made up of a plurality of superimposed layers, each layer including threads of spun glass disposed in substantially parallelism, the threads of one layer being disposed at an angle to the threads of the adjacent layer, the respective layers having relative freedom of movement.

2. An insulating body made up of a plurality of superimposed layers, each layer including threads of spun glass disposed in substantially parallelism, the threads of one layer being disposed at an angle to the threads of the adjacent layers, the respective layers having relative freedom of movement, the surface of the body being impregnated with an adhesive which remains elastic after drying.

In testimony whereof I affix my signature.

OSCAR GÖSSLER.